(12) United States Patent
Stephan et al.

(10) Patent No.: US 11,154,832 B2
(45) Date of Patent: Oct. 26, 2021

(54) FLUIDIZING PLATE AND APPARATUS COMPRISING SUCH A FLUIDIZING PLATE

(71) Applicant: BASF SE, Ludwigshafen (DE)

(72) Inventors: Oskar Stephan, Ludwigshafen (DE); Reiner Giese, Ludwigshafen (DE); Egon Schmidt, Ludwigshafen (DE); Juergen Freiberg, Ludwigshafen (DE); Norbert Eugen Voll, Ludwigshafen (DE); Michael Laible, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 49 days.

(21) Appl. No.: 16/616,529

(22) PCT Filed: May 29, 2018

(86) PCT No.: PCT/EP2018/064014
§ 371 (c)(1),
(2) Date: Nov. 25, 2019

(87) PCT Pub. No.: WO2018/219914
PCT Pub. Date: Dec. 6, 2018

(65) Prior Publication Data
US 2020/0101433 A1    Apr. 2, 2020

(30) Foreign Application Priority Data
May 31, 2017   (EP) ..................................... 17173627

(51) Int. Cl.
*B01J 8/44*      (2006.01)
*B01J 8/18*      (2006.01)
*C08F 20/14*     (2006.01)

(52) U.S. Cl.
CPC ............... *B01J 8/44* (2013.01); *B01J 8/1827* (2013.01); *B01J 8/1881* (2013.01); *C08F 20/14* (2013.01);
(Continued)

(58) Field of Classification Search
CPC .................. B01J 8/44; B01J 2208/0092; B01J 2208/00938
(Continued)

(56) References Cited

U.S. PATENT DOCUMENTS 2,944,009 A    7/1960  Huntley et al.
3,621,627 A    11/1971 Kramer
(Continued)

FOREIGN PATENT DOCUMENTS

DE           300694 A7       7/1992
DE         10051008 A1       4/2002
WO    WO-2011/026876 A1      3/2011

OTHER PUBLICATIONS

International Application No. PCT/EP2018/064014, International Search Report, dated Sep. 3, 2018.

*Primary Examiner* — Huy Tram Nguyen
(74) *Attorney, Agent, or Firm* — Marshall, Gerstein & Borun LLP

(57) ABSTRACT

The invention relates to a fluidizing plate, comprising a supporting structure and plate segments, the plate segments respectively having openings through which gas flows during operation. The plate segments are respectively releasably connected to the supporting structure and two neighboring plate segments respectively overlap and are releasably connected to one another in the region of the overlap. The invention also relates to an apparatus with such a fluidizing plate.

15 Claims, 5 Drawing Sheets

Figure 1:
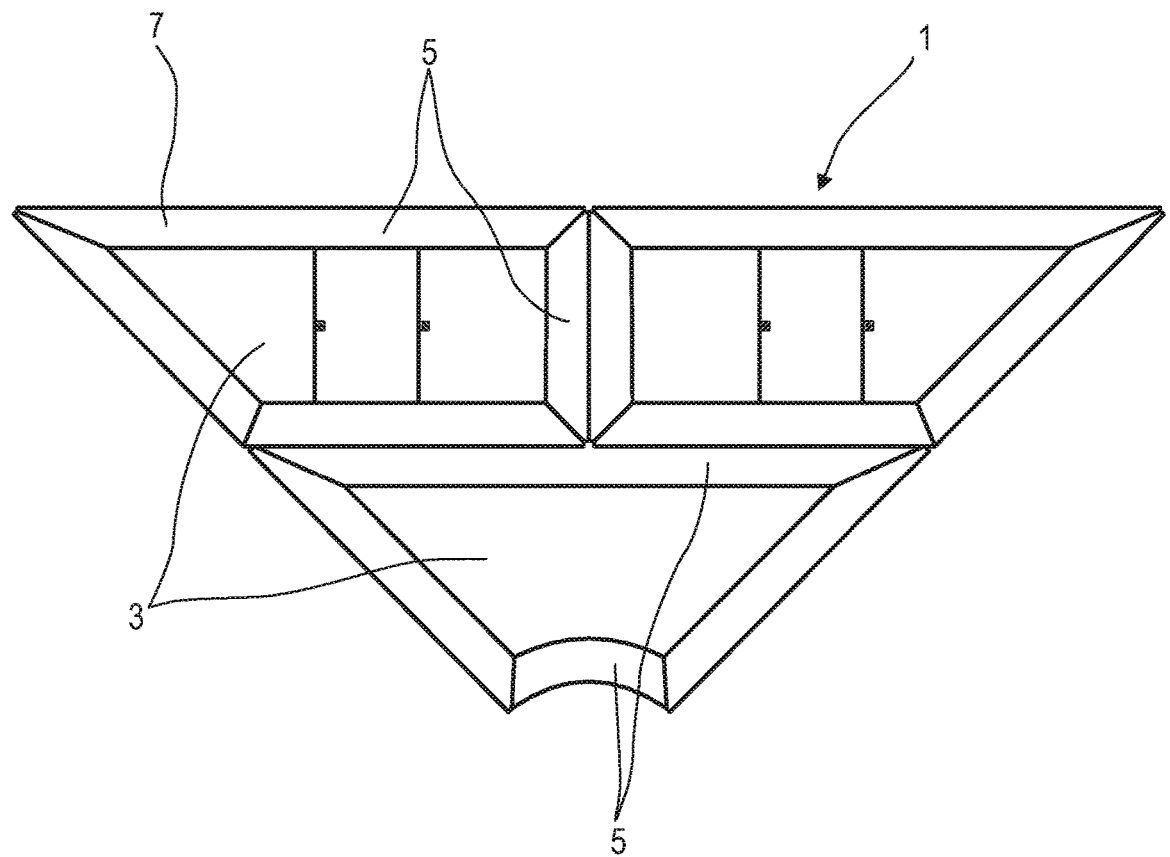

(52) U.S. Cl.
CPC ............... *B01J 2208/0092* (2013.01); *B01J 2208/00761* (2013.01); *B01J 2208/00938* (2013.01)

(58) Field of Classification Search
USPC ........................................ 422/131
See application file for complete search history.

(56) References Cited

U.S. PATENT DOCUMENTS

| | | | | |
|---|---|---|---|---|
| 4,300,458 A | * | 11/1981 | Comparato | ............... B01J 8/44 110/245 |
| 2016/0003193 A1 | * | 1/2016 | Matsuyama | .......... F16L 59/147 138/149 |
| 2018/0188149 A1 | | 7/2018 | Stephan et al. | |
| 2018/0306654 A1 | | 10/2018 | Stephan et al. | |
| 2018/0319906 A1 | | 11/2018 | Kruger et al. | |
| 2019/0003789 A1 | | 1/2019 | Stephan et al. | |

\* cited by examiner

FLUIDIZING PLATE AND APPARATUS COMPRISING SUCH A FLUIDIZING PLATE

CROSS-REFERENCE TO RELATED APPLICATIONS

This application is the U.S. National Stage application of International Patent Application No. PCT/EP2018/064014, filed May 29, 2018, which claims the benefit of European Patent Application No. 17173627.5, filed May 31, 2017.

The invention is based on a fluidizing plate, comprising a supporting structure and plate segments, the plate segments respectively having openings through which gas flows during operation. The invention also relates to an apparatus comprising such a fluidizing plate.

Fluidizing plates are used in all apparatuses in which a fluid bed or fluidized bed is contained. On the fluidizing plate there is a material in the form of powder or in the form of granules that is fluidized by a gas being introduced into the material in the form of powder or in the form of granules from below through openings in the fluidizing plate.

On account of the size of conventional installations in which fluidized beds are used, the fluidizing plates are usually made up of individual plate segments, the plate segments being welded to one another to form the fluidizing plate. In order to obtain sufficient stability of the fluidizing plate, the plate segments are usually additionally secured on a supporting structure, here the securement likewise taking place for example by welding or alternatively also by riveting. The entire plate comprising the supporting structure and the plate segments is then generally placed onto a supporting construction in the apparatus. The welding of the individual plate segments may cause stresses to occur in the plate. Distortion may also occur, causing deformations which may lead to leakages, for example at the edge of the plate, which subsequently have to be laboriously sealed off. Furthermore, the stresses in the individual plate segments may also lead to the connection to the supporting construction being released. When riveting is used for connecting the plate segments to the supporting construction, it is also possible here for the rivets to rupture and in this way contaminate the material in the form of powder or in the form of granules by corresponding metal parts.

A further disadvantage of the welded connections is that an exchange of plate segments that may possibly be necessary, for example in instances where they are damaged or become worn in the course of operation, is laborious. In this case it is necessary first to remove the plate segment and then to fit in a new plate segment. This requires that a large number of exactly fitting plate segments or even complete replacement plates are kept in stock in order to avoid long downtimes of the installation. This is so because otherwise, if corresponding plate segments were not kept in stock, it would be necessary to shut the installation down until a corresponding replacement part has been produced.

A further problem when exchanging individual plate segments is that the welded connections cause stresses, which have to be compensated. For example, it may be necessary to use additional tools such as hydraulic presses for disassembly.

A further problem may arise because the weld seams with which the plate segments are joined together to form the fluidizing plate are susceptible to cracking due to operationally induced vibrations and assembly-related stresses. The corresponding cracks then in turn cause downtimes of the installation to allow the necessary repairs to be carried out.

A segmented fluidizing plate is known for example from DE-A 100 51 008. In that case, the individual plate segments are connected to one another by holding elements, which are attached to the edge of the plate segments, so that an expansion joint is formed. An elastic material is placed in the expansion joint to prevent material from being able to fall out of the fluidized bed at the connecting points.

A fluidizing plate for a fluidized bed apparatus that is divided into a number of fluidizing plate segments is described in DD-A 300 694. A disadvantage of the fluidizing plates described is however that they are only suitable for relatively small apparatuses. The corresponding plates cannot be used in large apparatuses that require an additional supporting construction for the stability of the fluidizing plate.

The object of the present invention was therefore to provide a fluidizing plate that allows easy exchange of plate segments and easy assembly, in which no assembly-related stresses occur and which can also be used in large installations.

The object is achieved by a fluidizing plate, comprising a supporting structure and plate segments, the plate segments respectively having openings through which gas flows during operation, the plate segments respectively being releasably connected to the supporting structure and two neighboring plate segments respectively overlapping and being releasably connected to one another in the region of the overlap.

The openings in the plate segments are preferably designed such that, even whenever the fluidized bed is not in operation, and consequently no gas is being passed through the fluidizing plate, no material can fall out of the fluidized bed through the openings. For this purpose, either shrouds are fitted over the openings and/or the maximum opening width is smaller than the diameter of the particles of the fluidizing material. Particularly preferably, CONIDUR 6 plates are used as the material for the plate segments.

Designing the construction in such a way that the plate segments are releasably connected to the supporting structure allows an easy exchange, because all that is required to remove a corresponding plate segment is to release the connection. The overlapping of two neighboring plate segments allows them to be made with greater production tolerances, because the individual plate segments do not butt against one another, which could lead to stresses in the plate if there are great dimensional tolerances. Moreover, the releasable connection has the further advantage that stresses such as are produced for example by welded connections are avoided. In particular, there is no deformation of the plate segments such as that which may be caused by exposure to heating during welding.

A further advantage of the plate segments releasably connected to the supporting structure is that they can be formed in a standardized manner and thus, when an individual plate segment is damaged, a new plate segment can be fitted. This allows a quick exchange, because unlike in the case of plate segments that are welded to one another the cutting out of the damaged portion of the plate does not lead each time to differently shaped plate segments. Moreover, the overlapping of the plate segments allows a dimensional inaccuracy to be compensated during assembly.

It is particularly advantageous if most of the plate segments have the same form, since this reduces the stockkeeping of plate segments and only a relatively small proportion of plate segments have to be kept in stock in order to be able to perform an exchange in a case when it is needed, i.e. when the plate is damaged.

The releasable connection to the supporting structure also has the advantage that, when plate segments are damaged, the underlying construction is not damaged during disassembly, and consequently it is not necessary for the underlying construction to be newly put together. The overlapping connections also allow production machines, for example CNC machines, to be used specifically for producing the plates. For this purpose, the production drawings of the individual components of the fluidizing plate may be stored in the CNC machines, as a result of which the components can be reproduced exactly identically. This also ensures a dimensional stability of the replacement parts of the fluidizing plate.

The releasable connection of the individual plate segments also means furthermore that it is not necessary to brace the individual plate segments against one another by lateral screw connections on the supporting frame. This bracing of the individual plate segments in the case of fluidizing plates that are produced by the conventional method leads to curvatures of the surface of the plate.

For exchanging plate segments it was previously necessary to disassemble the entire plate, together with the underlying construction, that is to say the supporting structure, and put it together again. The design according to the invention with a releasable connection of the plate segments to the supporting structure makes it possible in an easy way for plate segments that are possibly defective to be removed and exchanged. This also leads to a considerable reduction in the disassembly and assembly times.

Any releasable connection known to a person skilled in the art is suitable as the releasable connection. Particularly suitable for this are clamping connections or screw connections. If screw connections are used, it is advantageous for easy assembly and disassembly of the plate segments if threads into which the screws for the screw connection can be screwed are formed in the supporting structure. As a result, it is only necessary for the fluidizing plate to be accessed from above in order to remove or fit individual plate segments. However, since the holes necessary for introducing the threads may lead to a reduction in the stability of the supporting structure, it is preferred if the releasable connection is a clamping connection.

It is also preferred if the plate segments are designed such that they are respectively connected to the supporting structure at the edge. In this case, the overlaps of two plate segments are respectively located above the supporting structure, so that securement of the plate segments to the supporting structure can take place in an easy way, specifically for example by a screw being passed through screw holes in the overlapping plate segments and screwed in in a thread in the supporting structure underneath the overlapping plate segments, or preferably the plate segment being secured on the supporting structure by a clamping connection. In the case of a design such that the overlapping region of two plate segments does not lie above the supporting structure and a securement by a screw connection, it would otherwise be necessary for connecting the plate segments that either a thread is formed in the underlying plate segment, in order to be able to screw the plate segments to one another, or alternatively that nuts are used to create the screw connection. In this case it would be necessary however for access to be possible both from above and from below both during assembly and during disassembly. In the case of conventional fluidized bed apparatuses, this would have the effect that two employees are required for exchanging plate segments, one being used underneath the fluidizing plate and one above the fluidizing plate, in order to be able to release the respective screw connections. It is therefore preferred if the form of the plate segments is adapted to the form of the supporting structure in such a way that the plate segments are respectively connected to the supporting structure at the edges.

In order to prevent gas from escaping in the region of the overlap between the plate segments and not being passed through the openings in the plate, it is also preferred if a sealing element is placed in the region of the overlap between the overlapping plate segments. A sealing cord is suitable for example as the sealing element. Any suitable material can be used as the material for the sealing element. Particularly preferably, the sealing element is made of polytetrafluoroethylene.

As a result of being made up of a supporting structure and overlapping plate segments in the region of the supporting structure, the plate has regions that cannot be flowed through by gas. In order to obtain a uniform flow of gas, in a preferred embodiment holes are formed in the supporting structure and in the overlapping plate segments, the holes in the supporting structure and in the plate segments being arranged in line with one another after assembly, so that the upwardly flowing gas can flow through the holes in the supporting structure and the plate segments.

The supporting structure on which the individual plate segments are secured may be made up for example of double-T beams. Alternatively, it is also possible to use any desired other profiles for making up the supporting structure. Here, the supporting structure usually takes the form of a framework, on which the individual plate segments are then secured. In particular in the case where the supporting structure is made up in the way previously also used, by two U profiles or else alternatively two L profiles being screwed to one another, a groove that particles can get into and be deposited in the case of welded plate segments usually forms as a result of the radii of the transition from one leg to the leg angled at 90°. The overlapping assembly of the plate segments and the placing in of sealing cords has the effect of preventing product from being able to get into corresponding cavities. Moreover, it is also possible to place sealing cords in the corresponding cavities, and in this way prevent that product from the fluidized bed can be deposited.

In order furthermore to prevent stresses from occurring as a result of temperature fluctuations in the case of screwed plate segments, it is also preferred if the holes through which the securing elements, in particular screws, are passed have a greater diameter than the screw shank. This allows a movement of the plate segments in the region of the securements, by which stresses can be compensated.

As an alternative to the supporting structure being made up of individual profiles, it is also possible to make up the supporting structure from struts that are inserted in one another. For this purpose, it is possible for example to form a honeycomb structure, on which the individual plate segments are secured. Unlike the supporting structure comprising individual profiles, however, a greater pressure loss may possibly occur, because a greater number of struts are used and butt straps at which the plate segments can be secured are preferably respectively formed on the individual struts. An advantage of such a supporting structure comprising struts inserted in one another is that an outer supporting frame of the supporting structure is no longer necessary. This obviates the need for a further component that can lead to stresses in the plate.

A further advantage of the struts inserted in one another for forming the supporting structure is that there is no longer the gap between the individual profiles that occurs in the case of a conventional supporting structure, and consequently deposits of product between the individual segments are no longer possible.

In a preferred embodiment, the supporting structure is made up at the borders of the segments, that is to say at the edges of the plate segments, of continuous struts and is made up within the individual segments of struts inserted in one another, which respectively end at the continuous struts and are connected to the continuous struts. Preferably, the continuous struts have holes, which are arranged in line with the holes in the plate segment, so that during operation gas can flow through the continuous struts and the plate segments secured on them. Continuous struts means in this case that the struts are of such a length that they extend along the borders of the segments of at least two neighboring segments. Preferably, the continuous struts extend from edge to edge of the plate. When the plate is made up of a number of portions, each portion in turn comprising a number of plate segments, the continuous struts preferably extend from edge to edge of the portion. In a particularly preferred embodiment, continuous struts that intersect at a right angle, so that the individual plate segments have at least one right angle, are provided.

On account of the size of the fluidizing plate, it may be necessary to provide additional stiffening elements on the supporting structure. The additional stiffening elements have the effect of preventing, or at least reducing, bending of the fluidized plate as a result of a high wind load.

In order in the case of screwed plate segments to prevent product buildups, and consequently damage, from occurring at protruding screw heads, it is also advantageous if the plate segments have a recess at the positions of the screw connections, so that after the screwing no screw head protrudes above the surface of the plate segments. As a result, a substantially planar surface of the fluidizing plate is achieved and unevennesses that can lead to product buildups are avoided.

It is also possible to design the screwing points in each case in such a way that an opening into which an insert is placed is respectively formed at them, the insert being formed as a sleeve with a flanged edge, the flanged edge resting on the plate segment after the insert has been placed into the opening and a hole through which a screw is passed being formed in the insert. The use of such an insert has the advantage in particular that the construction comprising the supporting structure and the plate segment can be leveled in relation to the supporting construction in a fluidized bed apparatus on which the fluidizing plate rests, so that for example a level plate surface can be achieved even in the case of a hanging-down supporting construction in the apparatus. For this purpose, it is possible for example to use correspondingly formed inserts, or alternatively leveling shims or sleeves, which are used in combination with the insert.

Furthermore, it is possible by an appropriate design of the insert and the opening in which the insert is placed to ensure a displaceability of the plates, so that stresses, for example due to thermal expansions, are prevented. For this purpose, the opening in the plate is made with a greater diameter than the insert, and the flanged edge for its part has a diameter that is so much greater than the diameter of the opening in the plate that the flanged edge always rests on the plate, even when the insert is lying against a point around the opening. This means that the sum of the diameter of the sleeve of the insert and the width of the flanged edge is greater than the diameter of the opening in which the insert is inserted. In order to achieve a sufficient displaceability of the plate, it is in this case preferred if the outside diameter of the sleeve of the insert is 5 to 20%, preferably 10 to 15%, and in particular 10 to 12%, smaller than the diameter of the opening in the plate segment through which the insert is passed.

Such a fluidizing plate can be used in any desired apparatus in which a fluidized bed is to be produced. For this purpose, the apparatus comprises the fluidizing plate and a gas feed is arranged underneath the fluidizing plate and a gas outlet is arranged above the fluidizing plate. Such an apparatus also comprises a solid material feed and a solid material outlet.

In order to obtain a uniform throughflow of the fluidized bed with the gas, it is also usual that the gas is fed in by way of a so-called windbox. For this purpose, a gas space into which the gas is introduced is formed underneath the fluidizing plate. The gas flows out of the windbox through the openings in the fluidizing plate into the fluidizing material, which rests on the fluidizing plate and forms the fluidized bed by the material, which is usually in the form of powder or in the form of particles, being fluidized by the gas flowing through. Since the gas flows continuously through the material on the fluidizing plate, it is necessary that the gas is removed from the apparatus above the fluidized bed. For this purpose, the gas outlet is positioned above the fluidized bed. It is in this case also possible to provide a solids separator, for example in the form of a hydrocyclone or a filter, after the gas outlet, in order to separate solid particles that are entrained with the gas flow.

In order furthermore to be able to feed and discharge the material to be fluidized, the solid material feed and the solid material outlet are provided. This allows a continuous solids throughput or alternatively also a batchwise throughput, the kind of solid material feed and solid material removal being dependent on the process in which the fluidized bed is being used.

In order to have easy accessibility to the fluidizing plate, and also to make up the apparatus in such a way that disassembly and assembly of the fluidizing plate is possible, a supporting construction on which the fluidizing plate rests is assembled in the apparatus. Here, the fluidizing plate rests with its supporting structure on the supporting construction in the apparatus. Depending on accessibility to the fluidizing plate, it is possible in this case for the assembly of the fluidizing plate first to mount the supporting structure on the supporting construction within the apparatus and subsequently to provide the plate segments. Such an assembly is made much easier by the plate according to the invention, in which the supporting structure and the plate segments are respectively releasably connected to one another. With a sufficiently heavy plate and sufficient material on the fluidizing plate, it may be sufficient simply to place the fluidizing plate on the supporting construction in the apparatus. In order to prevent that the fluidizing plate begins to vibrate when operation is in progress, and that the supporting construction in the apparatus can be damaged as a result, it is preferred if the supporting structure of the fluidizing plate is connected to the supporting construction. It is particularly preferred here to connect the supporting structure of the fluidizing plate to the supporting construction releasably, for example likewise by screw connections. As also in the case of the connections of the individual components of the plate to one another, this releasable connection has the advantage for example that deformations occurring due to welded connections are prevented. Moreover, as a difference from a welded connection of the supporting structure to the supporting construction, the releasable connection allows leveling of the plate, which is necessary for example if the supporting structure hangs down because of the dimensions of the apparatus or if dimensional deviations occur during the fitting of the supporting construction into the apparatus. The leveling allows the fluidizing plate to be fitted level in spite of dimensional deviations of the supporting construction in the apparatus. Leveling shims that are inserted between the supporting construction and the supporting structure may be used for example for the leveling. Here, the leveling shims are preferably introduced at the positions at which the supporting structure is connected to the supporting construction, in order to prevent the leveling shims from being able to slip while operation is in progress. Shims in the form of washers that enclose the screws used for connecting the supporting structure to the supporting construction are suitable in this case as leveling shims. If relatively great unevennesses have to be compensated, sleeves may also be used as an alternative to the leveling shims. Different deviations in the distance between the supporting structure and the supporting construction or else between the supporting structure and the plate segments can be compensated by using different numbers of leveling shims at the individual positions or by using leveling shims of different thicknesses.

Such an apparatus may be used for any desired application in which a fluidized bed is used.

The apparatus comprising the fluidizing plate is particularly preferably a reactor for producing poly(meth)acrylate in the form of powder, the fluidizing bed being arranged at the lower end of the reactor, so that during operation the poly(meth)acrylate in the form of powder falls through the reactor onto the fluidizing plate, gas can be fed in from below through the gas feed and thus a fluidized bed is formed on the fluidizing plate. The solid material is in this case fed in by a dropletizing device, through which monomers that polymerize within the reactor to form the powder are fed. Such a reactor is described for example in WO-A 2011/026876.

Figure 2:
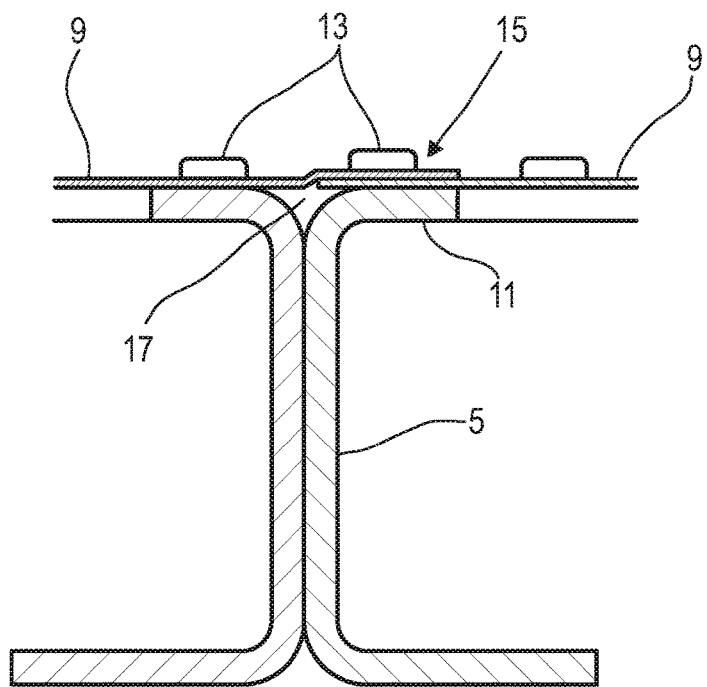
Figure 3:
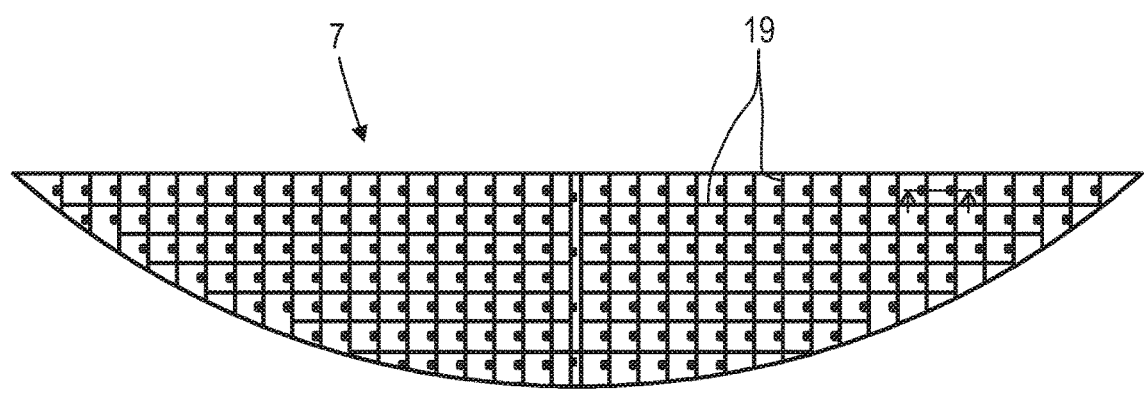
Figure 4:
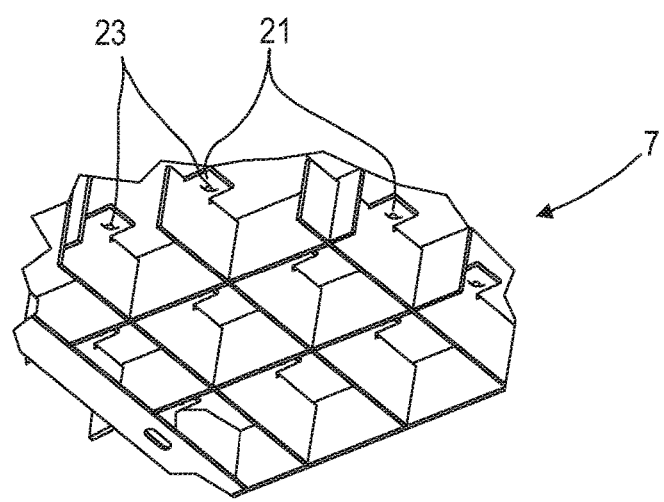
Figure 5:
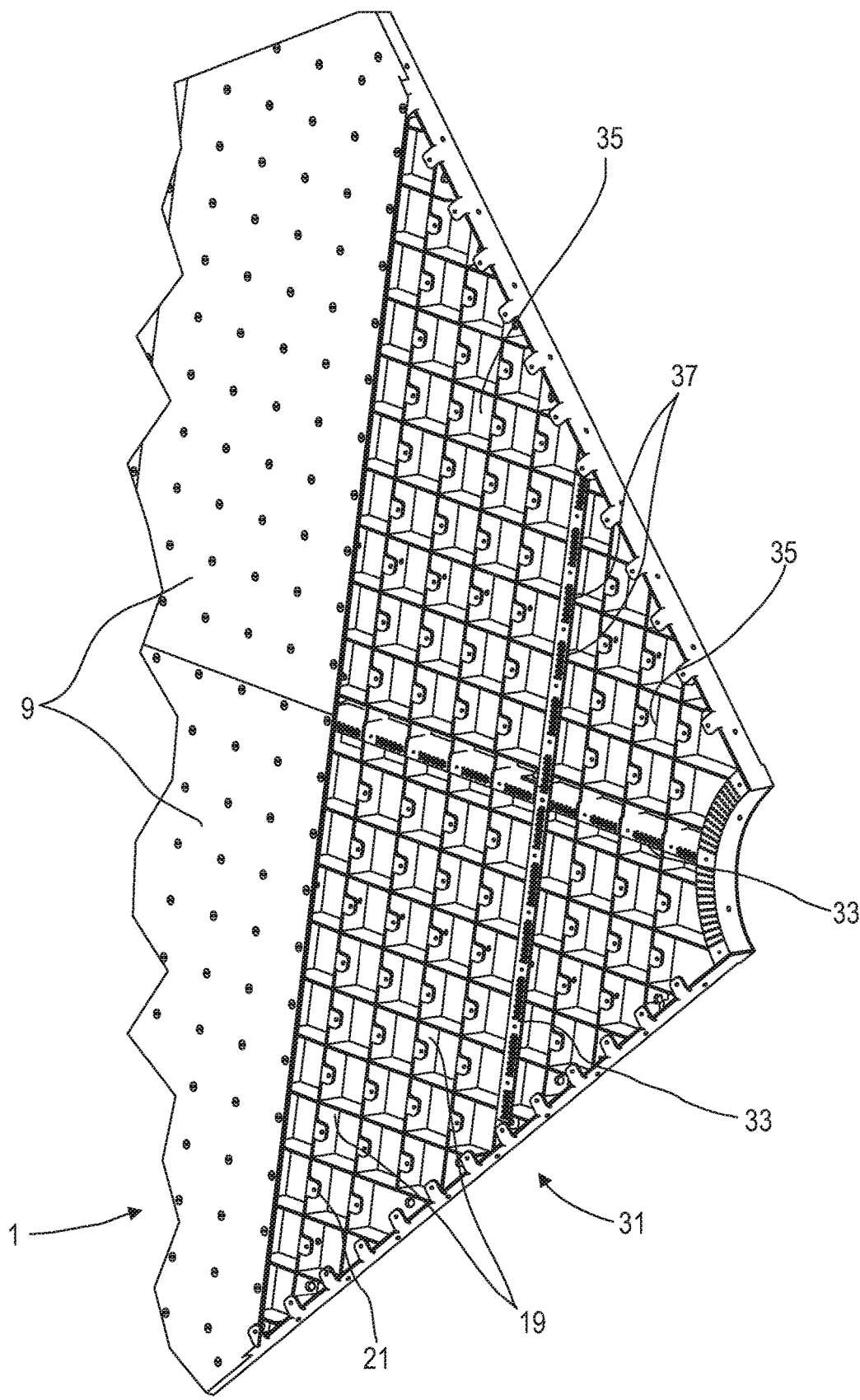
Figure 6:
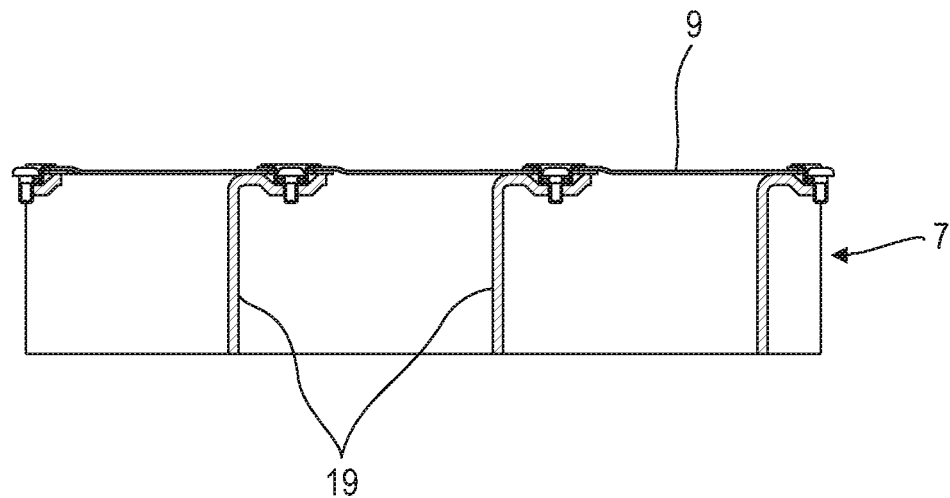
Figure 7:
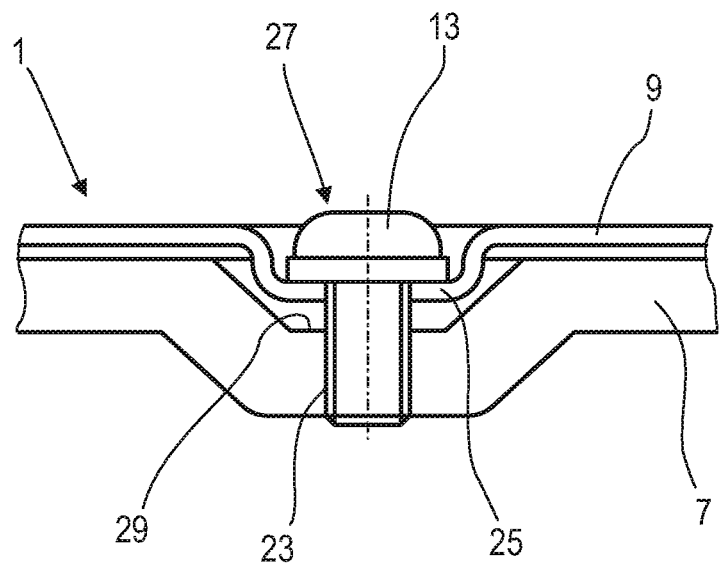
Figure 8:
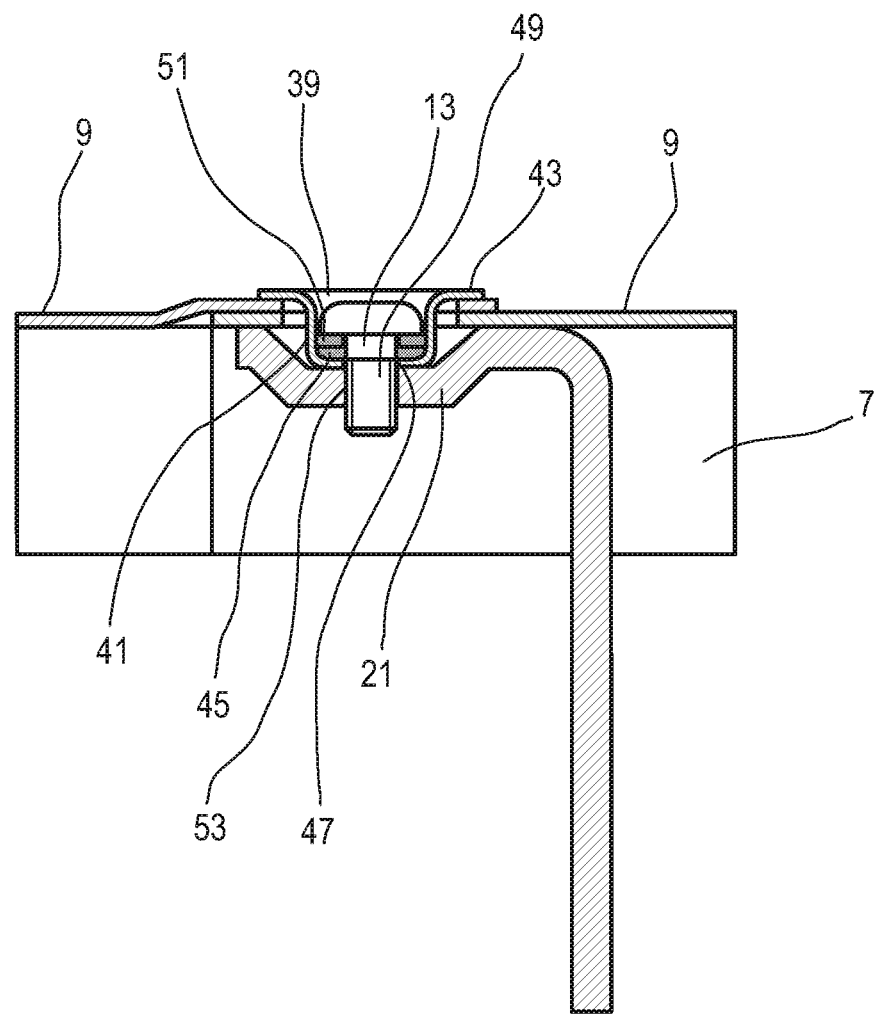

Embodiments of the invention are explained in more detail in the description that follows and are represented in the figures, in which:

FIG. 1 shows a portion of a fluidizing plate,

FIG. 2 shows a sectional representation through a supporting structure with plate segments provided on it, FIG. 3 shows a detail of a supporting structure in the form of a honeycomb, FIG. 4 shows a 3D representation of a detail of the supporting structure represented in FIG. 3, FIG. 5 shows a detail of a plate according to the invention in a 3D representation, FIG. 6 shows a detail of the supporting structure represented in FIG. 3 in a sectional representation, FIG. 7 shows a screw connection of a plate segment with the supporting structure, FIG. 8 shows a securement of two neighboring plate segments to the supporting structure.

In FIG. 1, a portion of a fluidizing plate is represented.

A fluidizing plate 1 is made up of a number of segments 3. Here, each segment is bounded by supports 5 of a supporting structure 7. Plate segments 9 are provided on the supporting structure 7, the individual plate segments 9 having openings through which gas can flow. CONIDUR® plates are preferably used as the material for the plate segments 9.

The individual supports 5 of the supporting structure 7 are for example profiled bars, which enclose the respective segments 3. Here, the individual profiles enclosing the respective segments 3 butt against one another and can be connected to one another and thus form the supporting structure 7.

A sectional representation through the supporting structure with plate segments provided on it is represented in FIG. 2 in the region of the connection of two segments.

The supports 5 are formed here in each case as U profiles, these being arranged in such a way that the plate segments 9 rest on a leg 11 of the support 5 and two supports 5 respectively lie against one another with the underside of the U profile.

The plate segments 9 are releasably connected to the supports 5. For this purpose, the plate segments are screwed onto the legs 11 of the support 5. For this purpose, screws 13 are passed through holes in the plate segments 9 and screwed in threads in the legs 11 of the supports 5. According to the invention, the plate segments 9 overlap in an overlapping region 15. The overlapping of the plate segments 9 in the overlapping region 15 has the effect on the one hand of preventing material from being able to get into the intermediate space 17 between the supports 5 and being deposited there. A further advantage is that no stresses due to thermal expansion can occur as a result of the appropriate design of the plate segments 9. It is also possible to make the plate segments 9 with a greater production tolerance.

An alternative supporting structure is represented in FIG. 3. In the case of the supporting structure represented in FIG. 3, individual struts 19 are connected to form a honeycomb structure. Here, the honeycomb structure as represented in FIG. 3 may form square honeycombs or else honeycombs of any desired other form. It is preferred in this case that the struts 19 are merely inserted in one another and thus form the supporting structure 7. The insertion of the struts 19 in one another has the advantage that no stresses due to welding of the individual struts 19 can occur. Moreover, the insertion of the individual struts in one another allows easy assembly, which can also take place within the apparatus.

Since in a fluidized bed apparatus the fluidizing plate is placed on a supporting construction, sufficient strength is also achieved by the fitting together of the struts. Moreover, the struts can also be connected with the aid of the plate segments 9 connected to the supporting structure, whereby the supporting structure 7 is stabilized.

In FIG. 4, a detail of the supporting structure represented in FIG. 3 is shown in a 3D representation. It can be seen that the individual struts 19 have butt straps 21, which are bent by 90° in relation to the struts. Formed in the butt straps 21 are threads 23, in which the plate segments 9 are screwed.

FIG. 5 shows a detail of a portion of a fluidizing plate in a three-dimensional representation.

In particular in the case of very large fluidizing plates 1, it is advisable to make them up from a number of portions 31. Here, a portion 31 comprises a number of plate segments 9. As can be seen in FIG. 5, a portion 31 may for example be a sector of a circle. It is preferred here if all the portions 31 are made up in the same way. The number of portions 31 is dependent on the size of the fluidizing plate 1 and preferably lies in the range from 2 to 8. It is particularly preferred to provide 3 to 6, and in particular 4, portions 31.

The portion 31 represented here has a supporting structure 7 with continuous struts 33 which are respectively arranged at the edges of the plate segments 9. This means as a result that the fluidizing plate is made up in a way in which the plate segments 9 are secured with their edges on the continuous struts 33. The securement is in this case preferably made to be releasable by screw connections or clamping connections, particularly preferably by clamping connections. In order to prevent gas from being able to flow through between plate segments 9, the plate segments 9 are connected to the continuous struts of the supporting structure in an overlapping manner in the region of the continuous struts 33. Segments 35 that are subsequently covered by the plate segments 9 are bounded by the continuous struts. Within the segments 35, the supporting structure 7 has struts 19 that preferably extend from one continuous strut 33 to the neighboring continuous strut 33 or alternatively from the edge of the portion 33 or of the fluidizing plate 1 to the next continuous strut 33. The struts 19 are preferably arranged in such a way that they cross one another within a segment 35, in this case the struts 19 in particular being inserted in one another in the way described above. For the securement of the plate segments 9, the struts 19 have butt straps 21, at which the plate segments 9 are secured, for example by screw connections, as represented by way of example in FIGS. 6 and 7.

In order not to hinder the flow of gas in the region of the continuous struts, holes 37 are formed in the continuous struts 33. These holes are arranged in such a way that they are in line with holes in the plate segments 9, so that gas can flow through the holes 37 in the continuous struts 33 and then through the holes in the plate segments 9.

Also when using a supporting structure 7 such as that represented in FIGS. 3 and 4, the individual plate segments 9 are connected to the supporting structure in an overlapping manner. How the plate segments 9 are screwed on the struts 19 is represented by way of example in FIG. 6.

Since screw heads protruding out of the plate segments may on the one hand tend to encourage depositions of fluidizing material and on the other hand may also be damaged by abrasion, whereby for example metal abrasive matter can get into a possible product, it is preferred if the securement of the plate segments 9 takes place in such a way that no screw heads protrude above the surface of the plate segments. For this purpose it is possible for example, as represented in FIG. 7, to provide a recess 25 in the region of the screw connection. Since the individual plate segments 9 rest on the supporting structure 7, it is in this case advantageous if the supporting structure 7 is formed in such a way that they likewise have a recess 29 in the region of the screw connections 27. In the recess 29 of the support 9 there is the thread 23, into which the screw 13 can be screwed. This makes it possible to countersink the screw in the fluidizing plate 1, so that the screw head does not protrude out of the fluidizing plate 1.

An embodiment for securing two neighboring plate segments to the supporting structure is represented by way of example in FIG. 8.

As also represented in FIG. 2, the plate segments 9 overlap in the region of the securement to the supporting structure 7. In order to be able to attach the plate segments 9 to the continuous strut 33 of the supporting structure 7, the continuous strut 9 has a butt strap 21, which is provided with an internal thread. As also in the case of the screw connection that is shown in FIG. 7, the butt strap 21 is designed in such a way that the screw connection of the plate segments 9 can take place in such a way that the screw head does not protrude above the plate segments 9 after assembly of the plate segments 9.

Since thermal expansions may occur at the plate segments on account of temperature fluctuations, the screw connection is provided in such a way that a displacement of the plate segments 9 in the region of the securement is possible. The possibility that the plate segments can be displaced in the region of the securement means that deformations due to the thermal expansions can be prevented. In order to be able to obtain such a displaceability, the plate segments 9 respectively have holes, inserted through which is an insert 39, which is designed as a sleeve 41 with a flanged edge 43. In order to be able to use the insert 39 for securing the plate segments 9, the sleeve 41 has at the bottom, that is to say on the side opposite from the flanged edge 43, a base 45. Formed in the base 45 is a hole 47, through which a securing element, for example a screw, can be passed. The diameter of the hole 47 is chosen in this case such that the thread 49 of the screw 13 can be easily passed through, but the screw head rests on the base 45. In order to prevent the screw head from falling through the hole, it is alternatively or additionally also possible to use suitable washers.

Used particularly preferably as the washer is a lock washer 51, which permanently prevents the screw from becoming loose even when there are strong vibrations of the plate; a suitable lock washer 51 is for example a wedge lock washer.

For assembly, the screw 13 is screwed into a corresponding internal thread 53 in the butt strap 21.

In order to seal off the thread in an airtight manner, in a particularly preferred embodiment the screw is coated with liquid polytetrafluoroethylene. As a result, seizing of the screws is at the same time reliably prevented.

In order to be able to compensate for possible unevennesses in the supporting structure 7, it is possible in all of the variants represented here to insert leveling shims, for example in the form of washers, or alternatively leveling sleeves in the region of the screws. In addition, it is possible to provide leveling elements, for example in the form of leveling shims or leveling sleeves, between the supporting structure and a supporting construction in the apparatus on which the fluidizing plate rests.

LIST OF DESIGNATIONS

1 Fluidizing plate
3 Segment
5 Support
7 Supporting structure
9 Plate segment
11 Leg
13 Screw
15 Overlapping region
17 Intermediate space
19 Strut
21 Butt strap
23 Thread
25 Recess
27 Screw connection
29 Recess
31 Portion
33 Continuous strut
35 Segment
37 Holes
39 Insert
41 Sleeve
43 Flanged edge
45 Base
47 Hole
49 Thread
51 Lock washer
53 Internal thread

The invention claimed is:
1. A fluidizing plate, comprising a supporting structure and plate segments, the plate segments respectively having openings through which gas flows during operation, wherein the plate segments are respectively releasably connected to the supporting structure and two neighboring plate segments respectively overlap and are releasably connected to one another in the region of the overlap.

2. The fluidizing plate as claimed in claim 1, wherein a releasable connection is used for releasably connecting the plate segments to the supporting structure and for releasably connecting two neighboring plate segments, the releasable connection being a clamping connection.

3. The fluidizing plate as claimed in claim 1, wherein the plate segments are formed such that they are respectively connected to the supporting structure at the edge.

4. The fluidizing plate as claimed in claim 3, wherein a sealing element is placed in the region of the overlap between the overlapping plate segments.

5. The fluidizing plate as claimed in claim 4, wherein the sealing element is a sealing cord.

6. The fluidizing plate as claimed in claim 4, wherein the sealing element is made of polytetrafluoroethylene.

7. The fluidizing plate as claimed in claim 1, wherein the supporting structure is made up of struts that are inserted in one another.

8. The fluidizing plate as claimed in claim 1, wherein an opening into which an insert is placed is respectively formed at screwing points, the insert being formed as a sleeve with a flanged edge, the flanged edge resting on the plate segment after the insert has been placed into the opening and a hole through which a screw is passed being formed in the insert.

9. The fluidizing plate as claimed in claim 8, wherein the outside diameter of the sleeve of the insert is 5 to 20% smaller than the diameter of the opening in the plate segment through which the insert is passed.

10. The fluidizing plate as claimed in claim 1, wherein the plate segments have a recess at the positions of screw connections, so that after the screwing no screw head protrudes above the surface of the plate segments.

11. An apparatus, comprising a fluidizing plate as claimed in claim 1, a gas feed being arranged underneath the fluidizing plate and a gas outlet being arranged above the fluidizing plate and the apparatus also comprising a solid material feed and a solid material outlet.

12. The apparatus as claimed in claim 11, wherein a supporting construction on which the fluidizing plate rests is assembled in the apparatus.

13. The apparatus as claimed in claim 12, wherein the supporting structure of the fluidizing plate is releasably connected to the supporting construction.

14. The apparatus as claimed in claim 12, wherein leveling shims are inserted for leveling the fluidizing plate between the supporting construction and the supporting structure.

15. The apparatus as claimed in claim 12, wherein the apparatus is a reactor for producing poly(meth)acrylate in the form of powder, the fluidizing plate being arranged at the lower end of the reactor, so that during operation the poly(meth)acrylate in the form of powder falls through the reactor onto the fluidizing plate, gas can be fed in from below through the gas feed and thus a fluidized bed is formed on the fluidizing plate.

\* \* \* \* \*